United States Patent [19]

Kagami et al.

[11] Patent Number: 5,384,762
[45] Date of Patent: Jan. 24, 1995

[54] FOCUSING SERVO IN AN OPTICAL DISK DRIVE

[75] Inventors: Naoyuki Kagami, Fujisawa; Hiroaki Kubo, Atsugi; Keiichi Okada, Yokohama, all of Japan

[73] Assignee: International Business Machines Corporation, Armonk, N.Y.

[21] Appl. No.: 191,738

[22] Filed: Feb. 4, 1994

Related U.S. Application Data

[63] Continuation of Ser. No. 34,192, Mar. 19, 1993, abandoned, which is a continuation of Ser. No. 757,759, Sep. 11, 1991, abandoned.

[30] Foreign Application Priority Data

Sep. 27, 1990 [JP] Japan .................. 2-255467

[51] Int. Cl.6 .............................................. G11B 7/00
[52] U.S. Cl. ................. 369/44.28; 369/44.29; 369/32
[58] Field of Search ............. 369/44.25, 44.36, 44.29, 369/44.31, 44.39, 44.28, 32, 124, 111, 44.11, 106, 44.35; 250/201.5

[56] References Cited

U.S. PATENT DOCUMENTS

| 4,497,047 | 1/1985 | Fujiie et al. | 369/44.25 |
|---|---|---|---|
| 4,512,004 | 4/1985 | Nonaka | 369/44.28 |
| 4,701,603 | 10/1987 | Dakin et al. | 369/44.29 |
| 4,888,756 | 12/1989 | Shikichi et al. | 369/44.35 |
| 4,890,273 | 12/1989 | Takeuchi et al. | 369/44.36 |
| 4,890,274 | 12/1989 | Kaneko et al. | 369/44.23 |
| 4,982,392 | 1/1991 | Soejima | 369/44.25 |
| 5,020,045 | 5/1991 | Smart et al. | 369/44.29 |
| 5,023,854 | 6/1991 | Satoh et al. | 369/44.36 |
| 5,038,333 | 8/1991 | Chow et al. | 369/44.29 |
| 5,121,370 | 6/1992 | Yamagi | 369/44.28 |
| 5,140,576 | 8/1992 | Yamada et al. | 369/44.29 |

FOREIGN PATENT DOCUMENTS

| 56-41533 | 4/1981 | Japan | 369/44.35 |
|---|---|---|---|
| 58-128031 | 1/1982 | Japan . | |
| 60-261035 | 6/1984 | Japan . | |
| 61-29424 | 2/1986 | Japan | 369/44.36 |
| 61-260429 | 11/1986 | Japan | 369/44.35 |
| 01290130 | 5/1988 | Japan . | |
| 63-241732 | 10/1988 | Japan | 369/44.35 |
| 63-119578 | 11/1988 | Japan . | |
| 63-298822 | 12/1988 | Japan | 369/44.35 |
| 3-118480 | 5/1991 | Japan | 369/44.35 |

Primary Examiner—Aristotelis Psitos
Assistant Examiner—Nabil Hindi
Attorney, Agent, or Firm—D. A. Shifrin

[57] ABSTRACT

An optical disk drive includes a gain control for controlling the gain of a focus servo loop in response to the seek velocity of an optical head. At a low seek velocity, the focus servo gain is reduced to minimize the influence of beam scattering on the groove of an optical disk onto a focusing error signal (FES) and a tracking error signal (TES).

6 Claims, 5 Drawing Sheets

FOCUSING SERVO IN AN OPTICAL DISK DRIVE

This is a continuation of co-pending U.S. application No. 08/034,192 filed Mar. 19, 1993 now abandoned, which is a continuation of U.S. application No. 07/757,759 filed Sep. 11, 1991, now abandoned.

BACKGROUND OF THE INVENTION

1. Field of the Invention

This invention relates to an optical disk drive, and more particularly, to control of the focusing servo of the optical disk drive.

2. Description of the Related Art

To optically record data on the recording surface of an optical disk and recover the recorded data, it is necessary to keep a spot of a laser beam in a focusing condition on the recording surface under focusing servo control. During a seek operation in which the laser beam moves across tracks, the positions of the laser beam are controlled based on a TES (Tracking Error Signal). It is necessary to keep a spot of the laser beam in a focusing condition on the recording surface to obtain a proper TES.

FIG. 5(A) shows a waveform of a FES (Focus Error Signal) obtained under the condition that the gain of a focus servo loop does not change during a seek operation. The scattering of a laser beam due to track groove affects the FES when the laser beam crosses the tracks and the FES takes the shape of a high-frequency signal or a low-frequency signal during a period of high seek velocity or a period of low seek velocity, respectively. A high-frequency FES does not cause a problem even though the high-frequency FES is input to a focus VCM (Voice Coil Motor) because the actuator cannot respond to the inputted FES, however, a low-frequency FES results in a defocusing condition in which a target track cannot be reached because the actuator responds to the low-frequency FES input to the focus VCM.

The above problem is described by reference to FIG. 5(B) to FIG. 5(E). FIG. 5(B) shows the contour of the disk surface during a seek operation, and FIG. 5(C) shows the position of a lens, that is, the movement of the lens in the focusing direction during the seek operation. The movement of the lens follows the contour of the disk surface during a period of high seek velocity. However, during a period of low seek velocity, the movement of the lens cannot follow the contour of the disk surface due to the effect of scattering based on the track groove. Thus, a defocusing condition occurs, as shown in FIG. 5(D). FIG. 5(E) shows a TES obtained during a seek operation. The TES has a constant amplitude during a period of high seek velocity, but has a low amplitude when defocus occurs during a period of low seek velocity. Since the seek operation is controlled by positional information provided by the TES, the seek operation becomes out of control and a target track cannot be reached.

In Japanese Published Unexamined Patent Application (kokai) No. 57-186239, a means for lowering the gain of focusing means during a seek operation to avoid occurrence of noise from a pickup is disclosed. However, this reference does not disclose the solution to the aforementioned problem. FIG. 6(A) to FIG. 6(E) correlate to FIG. 5(A) to FIG. 5(E). A sufficient driving force for following the contour of the disk surface cannot be obtained because the gain of the focusing means is lowered during a seek operation of high velocity and thus, the amplitude of the waveform of the lens elevation shown in FIG. 6 (C) becomes small relative to the amplitude of the waveform of the swing of disk surface shown in FIG. 6 (B). As shown in FIG. 6 (B), the amplitudes of the waveform showing the contour of the disk surface decrease as the seek operation varies from a high velocity to a low velocity, because the influence of mechanical tolerances included in the mechanical elements such as a coarse actuator, fine actuator, etc., increases in high seek velocity. Unstable amplitudes of the FES shown in FIG. 6 (A) indicate that a defocusing condition occurs as shown in FIG. 6(D) and those of the FES decrease according to the defocusing condition. As shown in FIG. 6(E), such defocusing condition causes the TES to be varied, track count errors to occur frequently, and the seek operation to be out of control.

SUMMARY OF THE INVENTION

The principal object of this invention is improved servo control in an optical disk drive.

Another object of this invention is to provide a proper amplitude of the TES, regardless of seek velocity, to properly perform a seek operation.

These and other objects are accomplished by an optical disk drive in which is provided a means for controlling the gain of focusing means in response to a seek velocity of an optical head. If the seek velocity is high, the gain of the focusing means remains unchanged to apply enough driving force to a focus VCM to make the movement of a lens respond to the swing of disk surface. If the seek velocity is low, the effect of beam scattering on a track groove upon the FES and the TES is lessened by decreasing the gain of the focusing means.

The optical disk drive includes a laser emitter for emitting and projecting a laser beam onto an optical disk, a tracking control means for controlling a projecting position of said laser beam to follow the track or tracks on said optical disk, a focusing means for controlling the emission of said laser beam to be in a focus condition on the recording surface of said optical disk, and an information recovery means for recovering recorded data based on a reflected beam from said optical disk or a transmitted beam through said optical disk, wherein said drive is provided with gain control means for controlling the control gain of said focusing means in response to the seek velocity at which a projecting position of said laser beam crosses the tracks. Further, the drive includes a focus servo gain control means for decreasing the gain of a focus servo loop at a time when the seek operation of an optical head is nearly completed. Because a seek velocity usually slows down when the seek operation is nearly completed, gain of the focusing means is maintained so that enough driving force is applied to a focus VCM to make the movement of a lens respond to the contour of the disk surface while the seek velocity is high, and to reduce the effect of beam scattering upon a track groove on the FES and the TES when the seek velocity becomes low at a time when the seek operation is nearly completed.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1:
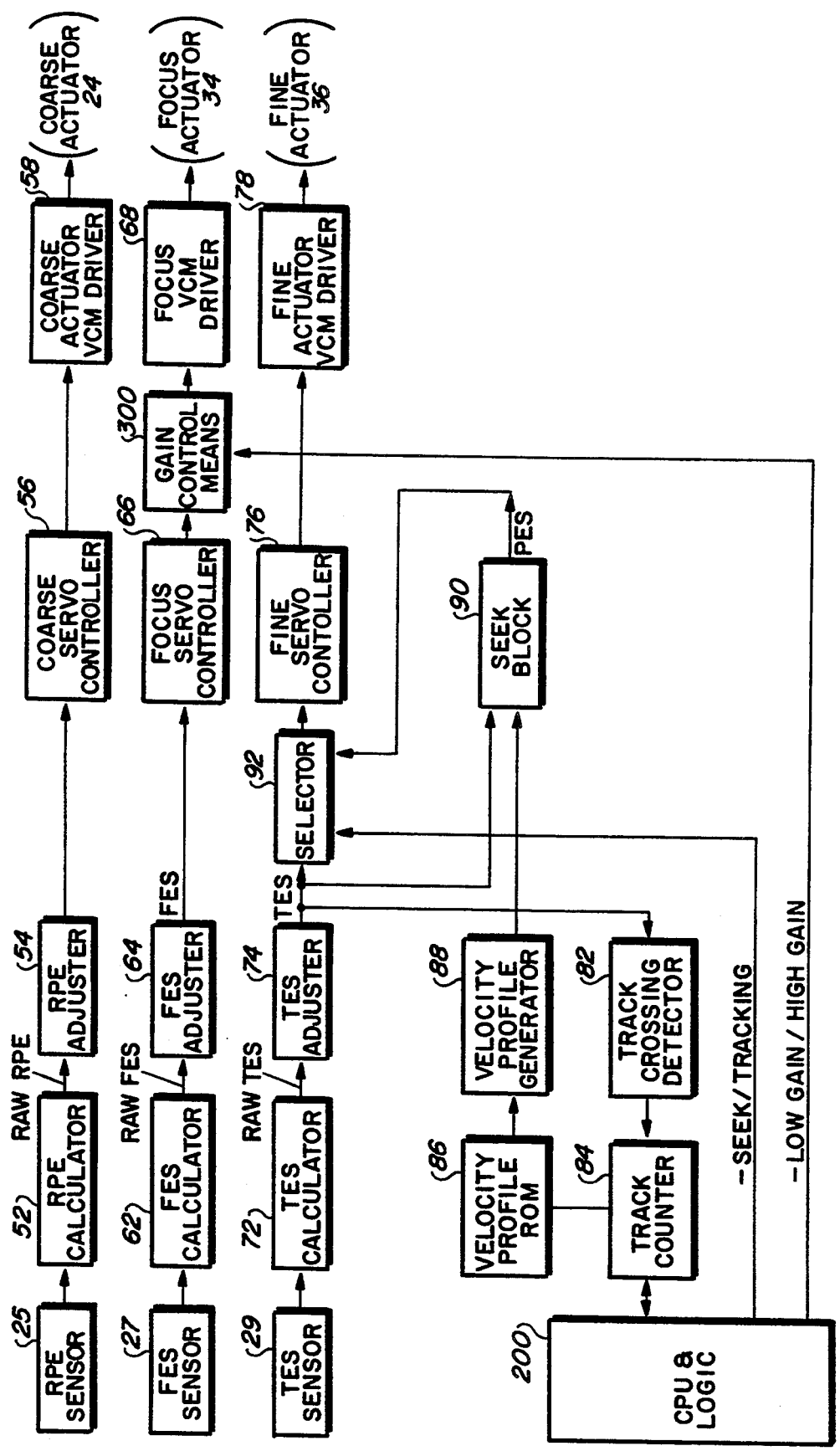
FIG. 1 is a block diagram showing a part of an embodiment of this invention.

Referring now more particularly to the drawing, like numerals denote like features and structural elements in the various figures.

Figure 2:
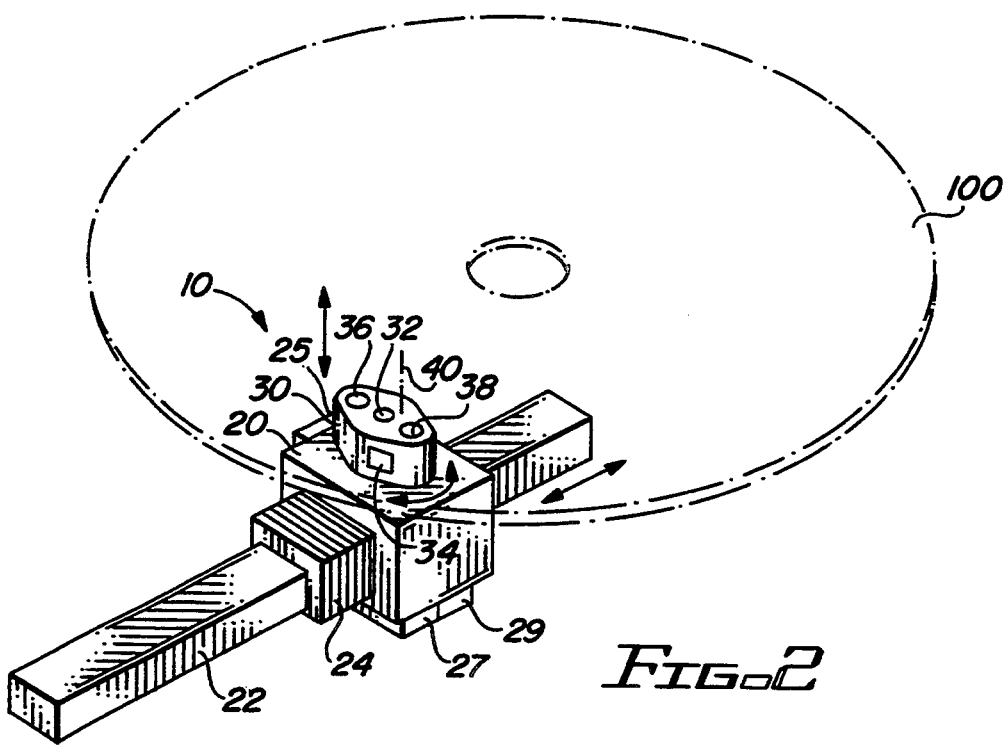
FIG. 2 is a perspective view showing another part of said embodiment.

FIG. 2 shows a part of an embodiment of an optical disk drive according to this invention. In the figure, an optical head 10 is composed of a coarse actuator 20 and a fine actuator 30. The coarse actuator 20 is supported by a rail 22 so that it can move freely in the radius direction of an optical disk 100 (in the direction of a seek operation), and is driven in the direction of the seek operation by a coarse actuator VCM 24. The fine actuator 30 is supported by the coarse actuator 20 by a shaft 32 so that it can move in the focusing and tracking directions and is driven in the focusing direction and in the tracking direction by a focus VCM 34 and a tracking VCM 36, respectively. The fine actuator 30 has an objective lens 38 through which a laser beam 40 is projected onto the optical disk 100.

Also, the coarse actuator 20 is provided with a relative position error (RPE) detecting sensor 25, a focus error signal (FES) detecting sensor 27, and a tracking error signal (TES) detecting sensor 29. The relative position error (RPE) detecting sensor 25, for example, a photo sensor with two split sensitive parts, detects the quantity of relative deflection (rotational deflection from a neutral position) of the fine actuator 30 from the coarse actuator 20. The focus error signal (FES) detecting sensor 27, for example, a photo sensor with four split sensitive parts detects a positional difference of a spot of the laser beam 40 from a focusing point on the optical disk 100. The tracking error signal (TES) detecting sensor 29, for example, a binary split photo sensor, detects a positional deviation of a spot of the laser beam 40 from the track center on the optical disk 100.

FIG. 1 shows another part of said embodiment. In the figure, an output of the relative position error (RPE) detecting sensor 25 is input to a RPE calculator 52. The RPE calculator 52, if the RPE detecting sensor 25 is a photo sensor with two split sensitive parts, calculates a difference between detecting signals from the two photo-sensitive parts and then outputs an unadjusted or raw RPE. The gain or offset of unadjusted RPE is adjusted by a RPE adjuster 54, and the adjusted RPE is provided to a coarse servo controller 56. After low-pass filtering and compensation for phase progress by the coarse servo controller 56, the RPE is provided to a coarse actuator VCM driver 58 from which driving current according to the amplitude and the sign of the RPE, that is, the quantity and the direction of a deflection of the fine actuator 30 relative to the coarse actuator 20, is provided to the coarse actuator VCM 24.

An output of the FES detecting sensor 27 is input to a FES calculator 62. The FES calculator 62, if the FES detecting sensor 27 is a photo sensor with four split sensitive parts, calculates a difference between a sum of detecting signals from a pair of two photo sensitive parts positioned diagonally each other and a sum of detecting signals from the remaining pair of two photo-sensitive parts also positioned diagonally to each other and then outputs an unadjusted FES. The offset of the unadjusted FES is adjusted by a FES adjuster 64, and the FES is provided to a focus servo controller 66. After low-pass filtering and compensation for phase progress by the focus servo controller 66, through a gain control means 300, the FES is provided to a focus VCM driver 68 from which driving current according to the amplitude and sign of the FES, that is, a positional deviation amplitude and a deviation direction of a spot of the laser beam 40 from the focus point, is provided to the focus VCM 34.

Hereafter, the focus error signal (FES) detecting sensor 27, the FES calculator, the FES adjuster, the focus servo controller 66, and the gain control means 300 compose the focusing means.

An output of the TES detecting sensor 29 is input to a TES calculator 72. The TES calculator 72, if the TES detecting sensor 29 is a photo sensor with two split sensitive parts, calculates a difference between detecting signals from a pair of two photo sensitive parts to output an unadjusted or raw TES. The gain and offset of the unadjusted TES are adjusted by the TES adjuster 74, and the TES thus obtained is provided to the tracking servo controller 76 and a fine actuator VCM driver 78 providing a driving signal for tracking to the tracking VCM 36.

On the other hand, the adjusted TES is also input to a track crossing detector 82 in which the number of times the optical head 10 (that is, a beam spot) crosses the tracks is detected based on a waveform of the TES and from which the result of detection is provided to a track counter 84. At the start of seek operation, a servo system controller (CPU plus logic circuit) 200 provides a value indicating a track distance from a current position to a target position to the track counter 84. A value contained in the track counter 84 is decreased by subtraction each time the optical head 10 crosses one track during the seek operation.

Figure 3:
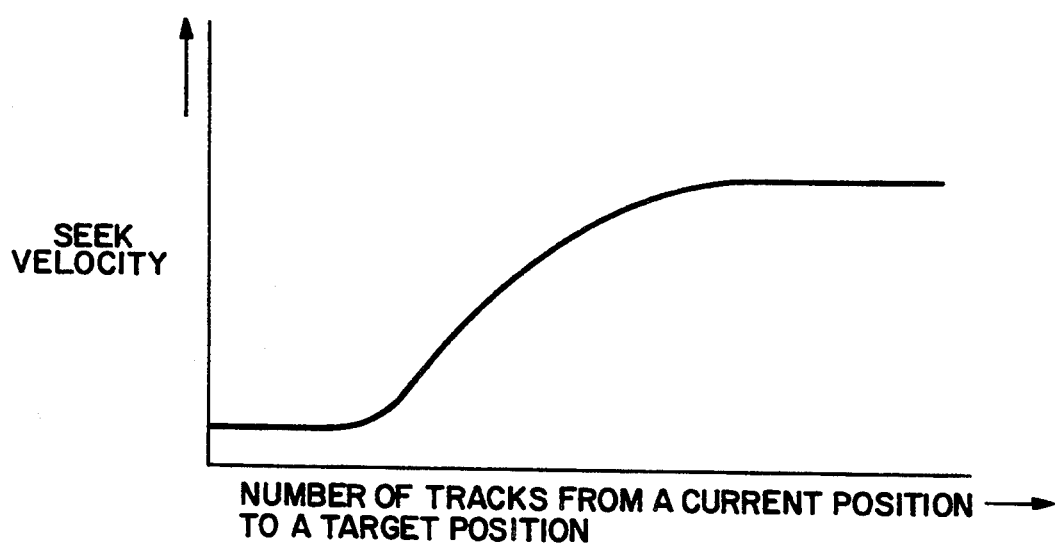
FIG. 3 is a graph showing a velocity profile of said embodiment.

The controller 200 is provided with a velocity profile ROM 86 in which information, for example, the relation between a track distance from a current position to the target position and a desired velocity, as in FIG. 3, used for controlling the seek velocity is stored. When information about the current position is provided based on the value of the track counter 84, the velocity profile ROM 86 outputs a desired velocity, represented as a digital value, at the current position to a velocity profile generator 88, in which the digital value is converted to an analog value output to a seek block 90. The seek block 90 compares the value obtained from the velocity profile generator 88 with the current velocity information conveyed by the TES to produce a positioning error signal (PES) which is an integrated value of the result of comparison. The PES is provided to a selector 92 to which the TES is also provided. In seek operation mode, the selector 92 provides the PES to the fine servo controller 76, and possibly also to the coarse servo controller 56. In tracking operation mode, the selector 92 provides the TES to the fine servo controller 76.

In the following, the seek operation of this embodiment is described by reference to FIG. 4(A) to FIG. 4(E).

At the start of a seek operation, the number of tracks from a seek start position to a target position is stored in the track counter 84 and the stored value is decreased by subtraction each time the optical head crosses a track during the seek operation. A seek velocity is determined based on the value stored in the track counter 84 by reference to a velocity profile (FIG. 3) in the velocity profile ROM 86.

For a short time after the seek operation starts, as shown in the velocity profile (FIG. 3), the seek operation is performed at a high velocity. During a period of such the high-velocity seek operation, the control gain of said focusing means is intended to remain the same as the value of a control gain during a period of a track following operation. If the controller 200 detects that the value contained in the track counter 84 is a predetermined value at a time when the seek operation is nearly completed, the controller 200 provides a control signal to the gain control means 300 to decrease the control gain of said focusing means to the predetermined value.

Figure 4:
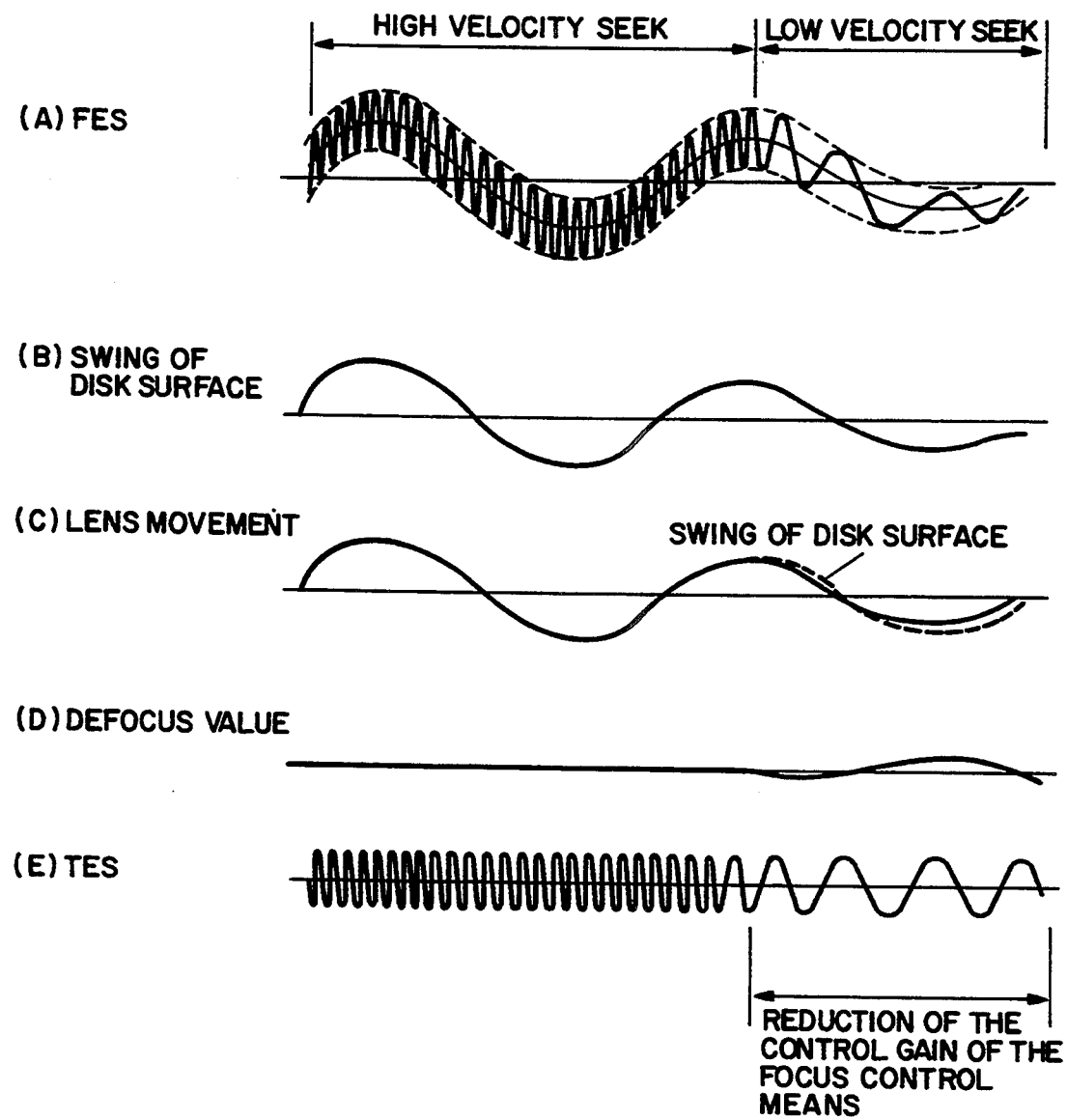
FIG. 4(A-E) are charts showing waveforms of a FES, the contour of the disk surface, the movement of a lens, the quantity of defocus, and a TES in said embodiment, respectively.
Figure 5:
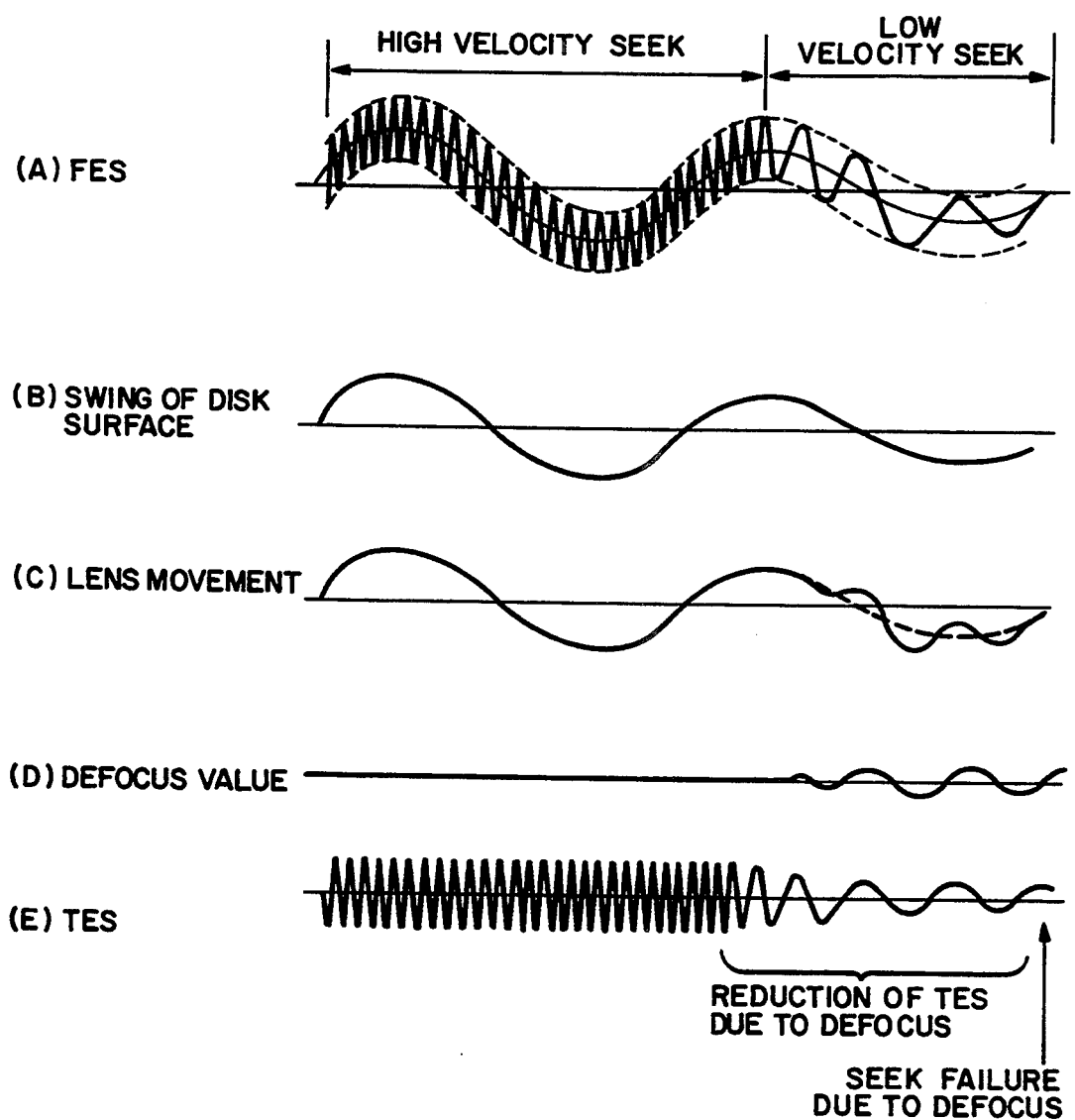
FIG. 5(A-E) are charts showing waveforms of a FES, the contour of the disk surface, the movement of a lens, the quantity of defocus, and a TES in a conventional apparatus, respectively.
Figure 6:
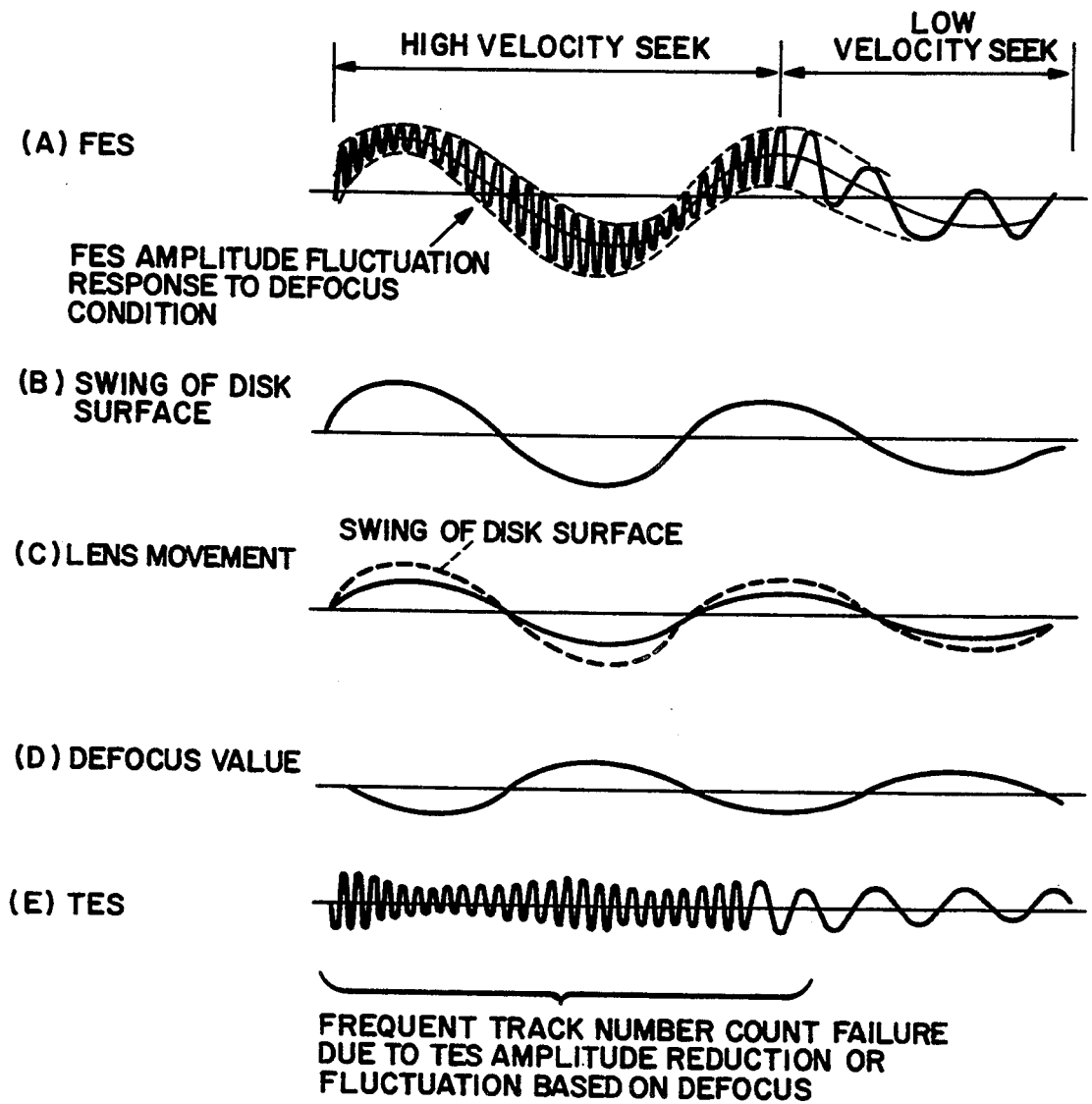
FIG. 6(A) to FIG. 6(E) are charts showing waveforms of a FES, the contour of the disk surface, the movement of a lens, the quantity of defocus, and a TES in another conventional apparatus, respectively.

The control gain of the focusing means thus varied, causes the effect of scattering due to a groove in track crossing conveyed by the FES to be reduced, as shown in FIG. 4(A). Thus, the movement of the lens (FIG. 4(C)) following the contour of the disk surface (FIG. 4(B)) is improved during the low-velocity seek operation to decrease the quantity of defocus (FIG. 4 (D)). As a result, as shown in FIG. 4(E), the amplitude of the TES is not decreased during the low-velocity seek operation and the proper TES required for controlling the seek operation can be obtained to perform the seek operation without disturbance.

While the invention has been particularly shown and described with reference to preferred embodiments thereof, it will be understood by those skilled in the art that various changes in form and details may be made therein without departing from the spirit and scope of the invention. For example, the control gain of the focusing mean, in said embodiment, is varied according to the value stored in the track counter 84, but it will be recognized that the control gain of the focusing means may be varied based on information relating to the seek velocity. Also, the control gain of the focusing means, in said embodiment, is varied either high or low, but it will be appreciated that the control gain of the focusing means may be varied in a variety of stages. Finally, the components of high frequency in the FES produced during the high-velocity seek operation, in said embodiment, are not specially removed, but it will be appreciated that said components of high frequency may be removed by a low-pass filter. Accordingly, the invention disclosed herein is to be limited only as specified in the following claims.

What is claimed is:

1. An optical disk drive for recovering data recorded on tracks on an optical disk, the optical disk drive comprising:
    a laser capable of emitting an optical beam projecting onto the optical disk;
    means coupled to the laser for controlling a projected position of the optical beam to follow a track on the optical disk and to seek across tracks of the optical disk;
    means for monitoring a seek velocity of the optical beam;
    means for counting the number of tracks remaining to be crossed during a seek across tracks of an optical disk; and
    focusing means coupled to the laser for controlling the projection of the optical beam to be in a focus condition on a recording surface of the optical disk, the focusing means including a focus servo and means for adjusting a gain of the focus servo loop in response to a reduction in a seek velocity of the optical beam detected by said velocity monitoring means only when an end portion of the seek across tracks of the optical disk is detected by said counting means.

2. The optical disk drive of claim 1 wherein the focusing means decreases the gain of the focus servo loop in response to a reduction below a predetermined value of the seek velocity of the optical beam in seeking across tracks of the optical disk.

3. An optical disk drive for recovering data recorded on tracks on an optical disk, the optical disk drive comprising:
    a laser capable of emitting an optical beam projecting onto the optical disk;
    means coupled to the laser for controlling a projected position of the optical beam to follow a track on the optical disk and to seek across tracks to a target track of the optical disk;
    means for counting the number of tracks remaining to be crossed during a seek across tracks of the optical disk and for comparing the track count with a predetermined track count indicative of an end portion of the seek; and
    focusing means coupled to the laser for controlling the projection of the optical beam to be in a focus condition on a recording surface of the optical disk, the focusing means including a focus servo and means for adjusting a gain of the focus servo loop only in response to reading the predetermined track count from said counting means indicating that the projected position of the optical beam relative to the target track has reached the end portion of the seek across tracks of the optical disk.

4. A method for focusing an optical beam on a track of an optical disk in an optical disk drive, the optical disk drive including means for emitting the optical beam projecting onto the optical disk, a focus servo and means for adjusting a gain of the focus servo loop, the method comprising:
    seeking across tracks of the optical disk to position the optical beam over the track;
    counting the number of tracks remaining to be crossed during the seek;
    comparing the track count with a predetermined track count indicative of an end portion of the seek;
    monitoring a seek velocity of the optical beam; and
    adjusting a gain of the focus servo loop in response to a reduction in the seek velocity of the optical beam only when the predetermined track count is reached.

5. The method of claim 4 wherein the adjusting step includes decreasing the gain of the focus servo loop in response to a reduction below a predetermined value of the seek velocity of the optical beam.

6. A method for focusing an optical beam on a track of an optical disk in an optical disk drive, the optical disk drive including means for emitting the optical beam projecting onto the optical disk, a focus servo and means for adjusting a gain of the focus servo loop, the method comprising:

seeking across tracks of the optical disk to position the optical beam over the target track;

counting the number of tracks remaining to be crossed during the seek;

comparing the track count with a predetermined track count indicating that the position of the optical beam relative to the target track has reached of an end portion of the seek across tracks;

monitoring a seek velocity of the optical beam; and adjusting a gain of the focus servo loop only in response to reading the predetermined track count.

* * * * *